United States Patent [19]

Yanna

[11] Patent Number: 4,934,093
[45] Date of Patent: Jun. 19, 1990

[54] LANDSCAPE EDGING

[76] Inventor: Harold E. Yanna, 2668 Saginaw Hwy., Mulliken, Mich. 48861

[21] Appl. No.: 308,050

[22] Filed: Feb. 9, 1989

[51] Int. Cl.$^5$ .............................................. A01G 13/00
[52] U.S. Cl. ........................................ 47/33; 47/25; 47/32; 52/102; 404/7
[58] Field of Search ................... 47/23, 24, 25, 32, 33; 52/102; 404/7

[56] References Cited

U.S. PATENT DOCUMENTS

| | | | |
|---|---|---|---|
| 68,971 | 9/1867 | Fancher | 404/7 |
| 113,003 | 3/1871 | Biehl | 404/7 X |
| 313,424 | 3/1885 | Hughes | 47/25 |
| 3,087,279 | 4/1963 | Thompson | 47/33 |
| 3,287,851 | 11/1966 | Cramer | 47/25 |
| 3,305,969 | 2/1967 | Mattson | 47/25 |
| 3,857,195 | 12/1974 | Johnson | 47/25 X |
| 3,945,747 | 3/1976 | Cruz | 404/7 |
| 4,031,676 | 6/1977 | Dally | 52/102 |
| 4,074,479 | 2/1978 | Krupka | 52/102 |
| 4,268,992 | 5/1981 | Scharf | 47/25 X |
| 4,308,688 | 1/1982 | Revane | 47/25 |
| 4,502,244 | 3/1985 | Yoham | 47/25 |
| 4,642,938 | 2/1987 | Georges et al. | 47/25 |
| 4,700,507 | 10/1987 | Allen | 47/23 |
| 4,831,776 | 5/1989 | Fritch | 404/7 X |

FOREIGN PATENT DOCUMENTS

| | | | |
|---|---|---|---|
| 488083 | of 1952 | Canada | 404/7 |
| 0283336 | 9/1988 | European Pat. Off. | 404/7 |
| 1217531 | 5/1960 | France | 47/25 |
| 2221950 | 10/1974 | France | 404/7 |
| 266726 | of 1927 | United Kingdom | 47/32 |

*Primary Examiner*—David A. Scherbel
*Assistant Examiner*—Jerrold D. Johnson
*Attorney, Agent, or Firm*—Krass and Young

[57] ABSTRACT

Landscape edging for defining a border proximate plant life comprises a generally planar member, an interior flange generally parallel to the plane of the member extending along a first portion thereof, and an exterior flange generally parallel to the plane of the member and extending along a second portion thereof. The member further includes a contiguous, raised wall projecting generally perpendicularly to the plane of the member, the wall is interposed between the interior and exterior flanges of the member and extends along the length of the member. The wall cooperates with the interior flange of the member to retain a mulch media thereby, and the wall, the interior and exterior flanges cooperate to limit the growth of undesirable foliage beneath the member. Various shapes of edging are disclosed.

8 Claims, 1 Drawing Sheet

U.S. Patent    Jun. 19, 1990    4,934,093
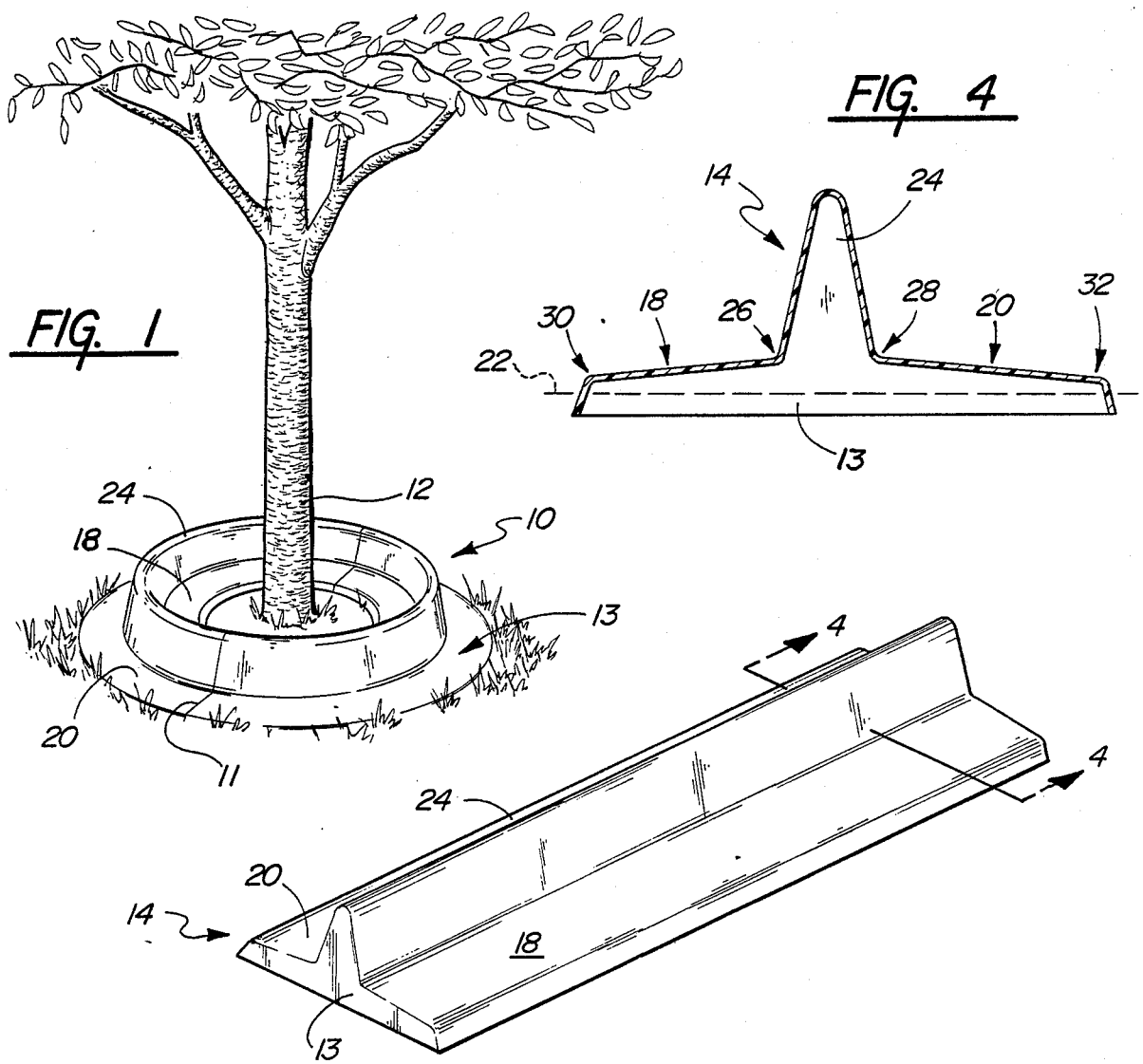
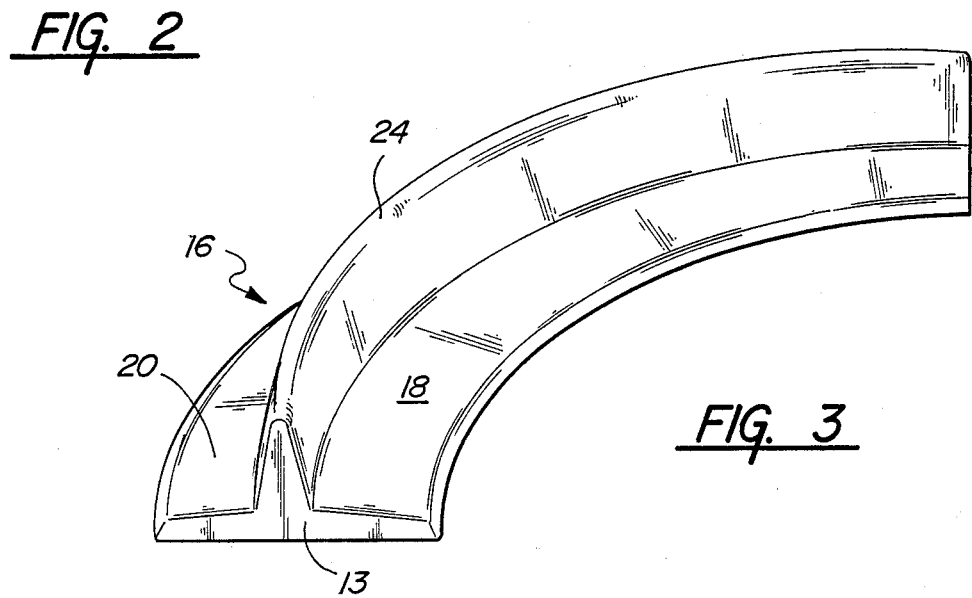

LANDSCAPE EDGING

BACKGROUND OF THE INVENTION

1. Field of the Invention

The present invention relates generally to borders placed proximate a garden or surrounding a tree. More particularly the invention relates to landscape edging members for defining a border proximate plant life, the edging configured to retain mulch about the plant life and limit the growth of undesirable foliage.

2. Description of the Prior Art

Landscape architecture recently has become a primary focus for many homeowners and commercial business owners alike. Often a home or business place has a garden area nearby that includes bushes, flowering plants, vegetables, small trees and the like. Recurring problems arise in that grass, weeds and other undesirable foliage often grow into the garden from adjacent lawns and beneficial mulch media blows away in strong winds. Many different types of border members have been proposed to solve these problems.

For example, U.S. Pat. No. 4,502,244 discloses an in-ground tree skirt structured to hold mulch material around the base of a tree. The tree skirt comprises an upper tray and a lower base positioned at the base of the tree which base includes an annular receptacle configured to be secured in the earth extending radially outwardly from the tree. Holes in the base are configured to allow water and fertilizer therethrough to feed the root system of the tree. The skirt can not be adapted to define a border between a garden and a lawn edge however.

U.S. Pat. No. 3,305,969 discloses a generally flat, molded plastic tree skirt configured to smother grass and weeds growing beneath it. The skirt acts to moisten and condition the subjacent soil and earth to promote uninhibited growth of the tree's trunk and roots and minimize lawn mowing requirements around the tree. U.S. Pat. No. 4,308,688 discloses another tree skirt configured as a flat member having a plurality of ribs which are disposed into the ground on the bottom side of the tree skirt. This tree skirt is a two-piece device which does not function to retain mulch material around the perimeter of the tree.

U.S. Pat. No. 3,287,851 discloses a tree protector configured as a two-part, square-shaped device in which the two separate parts telescope to provide adjustability for the growing tree. The protector does not include any mulch retaining function nor is it adapted to be used as a border between a garden and a lawn edge.

It can therefore be seen that there is yet a need for landscape edging which can be placed proximate plant life to prevent mulch media and other beneficial nutrients from becoming dislodged or blown away and which also prevents the growth of undesirable foliage at the lawn-garden border. This edging material should be low cost, easy to fabricate and install and resistant to extreme weather conditions. The present invention addresses these problems by providing landscape edging which defines a border between plant life, such as gardens and trees, and a surrounding lawn and which includes means for retaining mulch medium surrounding the plant life. The edging also eases lawn mowing proximate the border so as to obviate the need for lawn trimming equipment.

These and other advantages of the present invention will be apparent from the discussion, drawings and claims which follow:

SUMMARY OF THE INVENTION

Disclosed herein is landscape edging for defining a border proximate plant life such as trees, flower beds, or gardens. The edging comprises a generally planar member configured to be placed proximate the plant life to define a border thereby. The member further includes a contiguous, raised wall member disposed on one side thereof and projecting generally perpendicularly to the plane of the planar member. The wall member extends along the length of the planar member in spaced relation with both edges thereof so as to define an interior flange portion and an outer flange portion of said planar member. The wall member is configured to cooperate with the interior flange portion of the planar member to retain mulch media and other beneficial nutrients in the garden. The interior flange portion, the exterior flange portion and the wall cooperate to limit the growth of undesirable foliage beneath the edging proximate the plant life. The wall portion may be tapered and the interior and exterior flange portions may be inclined relative to the plane of the member so that water may run off the edging and into the garden to feed tree roots and plant life.

The edging may be configured in many shapes. The edging may be an elongated, generally straight member or an arcuate-shaped member configured to be placed in abutting relationship with another member. The edging may be in the form of an annulus configured to be placed around a tree having a central opening for receiving the tree therein. The garden edging is preferably fabricated from synthetic polymeric materials and may be manufactured as a unitary, molded item.

BRIEF DESCRIPTION OF THE DRAWINGS

FIG. 1 is a perspective view of one embodiment of edging the present invention configured to be placed around a tree or other plant life;

FIG. 2 is another embodiment of the present invention wherein the garden edging is a straight member;

FIG. 3 is a third alternative of the present invention wherein the garden edging is arcuate-shaped member; and FIG. 4 is a cross-sectional view of the embodiment of FIG. 2 taken through line 4—4.

DETAILED DESCRIPTION OF THE INVENTION

Referring now to the drawings, FIG. 1 illustrates a perspective view of one particular embodiment of lawn edging 10 as specifically configured to encircle a tree trunk 12. As will be explained in greater detail hereinbelow, the edging member 10 serves to retain mulch and limit the growth of grass and weeds proximate the tree trunk 12. In general, the edging member 10 comprises a generally planar member 13 shaped as an annulus and defining a central opening therein. Disposed upon the planar member 13 is a raised wall 24 which serves to divide the planar member 13 into an inner flange portion 18 and an outer flange portion 20. The wall 24 and inner flange portion 18 cooperate to retain mulch material about the base of the tree 12. The outer flange portion 20 limits the encroachment of grass and weeds upon the tree and provides a neat and trim appearance. The outer flange portion 20 provides a base upon which a lawn mower may be run to trim grass at the edge thereof, thereby eliminating the need to use string trimmers, clippers and similar equipment.

The edging 10 of FIG. 1 may be fabricated from a variety of materials including concrete, metals, synthetic polymeric materials including reinforced polymeric materials, rubber and the like. In order to facilitate positioning of the edging about a tree, a break 11 is included therein. In those instances where the edging 10 is fabricated from a flexible material, it may be readily positioned about the tree by opening the break 11 and sliding it around the trunk. Obviously, in those instances where the edging 10 is fabricated from a rigid material such as concrete or the like two breaks will have to be included.

In addition to the annular embodiment of FIG. 1, the edging of the present invention may be manufactured and utilized in various other shapes to define linear, curved or free-form garden beds. FIG. 2 illustrates a linear version of the edging or as FIG. 3 illustrates a curved or arcuate segment. By combining various linear and curved shapes a variety of garden beds may be defined.

Referring now to FIG. 2, there is shown a perspective view of a linear edging member 14. The member is generally similar to that described with reference to FIG. 1 and includes a planar member 13 having a wall member 24 disposed thereupon in spaced relationship with both edges of the planar member 13. The wall member 24 defines an inner flange portion 18 and an outer flange portion 20 upon the planar member 13.

FIG. 3 similarly illustrates a curved or arcuate edging member 16 generally similar to those previously described and including a planar member 13, a wall member 24 and inner and outer flange portions 18 and 20. It is to be kept in mind that the terms inner and outer flange portions are relative and interchangeable depending upon the orientation of the edging member. For example, the member 16 is shown including an inner flange portion 18 on the interior of the curved wall and an outer flange portion 20 on the exterior of the curved wall. In use, it might be desirable to position the member such that the inner flange portion 18 is to the exterior of the garden plot and in such instance the outer flange portion 20 and wall member 24 will cooperate to retain mulch in the garden bed.

Referring now to FIG. 4, there is shown a cross-sectional view of the edging member 14 of FIG. 2 as taken along line 4—4, it being kept in mind that this cross section will be typical of the cross sections of the FIGS. 1 and 3 embodiments likewise. Visible in the FIG. 4 illustration is the generally planar member 13, wall member 24 and inner and outer flanges 18 and 20 as previously described. Also indicated in FIG. 4 at dotted line 22 is a reference plane which for purposes of the explanation in this specification will be referred to as the plane of the planar member.

As shown in the FIG. 4 embodiment, the interior flange 18 and the exterior flange 20 are inclined relative to the plane 22 so that the inner ends 26,28 of each flange adjacent wall 24 are separated from the plane of the planar member 22 by a greater distance than are the corresponding outer ends 30,32. By so inclining, the interior 18 and exterior 20 flanges, water from rain or irrigation is directed to run toward the garden plot as well as toward the exterior surrounding area. This ensures efficiency of irrigation and prevents collection of water on the garden edging. It has generally been found that a five degree slope to the interior and exterior flanges 18,20 is generally sufficient to ensure adequate drainage.

It will also be noted from the figure that the wall 24 is generally tapered from top to bottom so that it is widest proximate its junction with the planar member 13. It should be kept in mind, however, that the wall member 24 need not be tapered and that the flanges need not be sloped.

In use, it is generally preferably that the edging be embedded to some degree in the surrounding soil so as to anchor the edging thereinto and to provide a more aesthetically appealing appearance. Generally, it is preferable to embed the edging so that the flange portions smoothly join the surrounding earth. In this manner, as mentioned previously, a lawn mower may be simply run onto the edging, thereby simply eliminating the need for special trimming steps and tools. As mentioned hereinabove, a great variety of materials may be utilized to manufacture the edging of the present invention. It should also be noted that a great many fabrication techniques may also be employed to fabricate the edging including molding, casting and machining techniques. It has been found most advantageous to fabricate the edging members as hollow units having the wall and planar portions integral with one another. Such fabrication may be by extrusion, injection or blow molding. By manufacturing the members as hollow members, raw materials are conserved, weight is reduced, and storage is simplified since the hollow members may be readily stacked one upon the another.

The dimensions of the members may vary according to the needs and desires of the homeowner. In one embodiment, the wall member may range between 2½ to 3½ inches in height, the interior flange may range from 2½ to 3½ inches in length, and the exterior flange may be approximately 2–3 inches in length. Obviously, these dimensions are meant only as examples and not limitations upon the invention. Since it is contemplated that the edging may be similarly utilized for flower boxes and smaller garden plots.

In light of the foregoing, it should be apparent that many variations are possible within the scope of the present invention. For example, the garden edging may be fabricated in a variety of shapes such as triangular pieces, wedge-shaped pieces or square-shaped borders. The wall member may be configured as a tapered or straight member or may be manufactured in a variety of different shapes such as half-moon or crescent shapes to give aesthetically pleasing results to the border of a garden. The annular-shaped pieces may also be fabricated in a variety of different sizes to accommodate different sized trees. The garden edging may be fabricated from colored synthetic polymeric materials or may be subsequently colored by conventional coloring or painting processes. The edging may be fabricated from a flexible material which may be conformed to an irregular garden plot by the user. The edging need not be generally planar but may be slightly rounded to give a saucer or bowl-like appearance to a garden. The edging may be modified so as to be secured into the ground in a variety of methods such as by spikes, nails, trenching, burying and the like. Accordingly, the foregoing drawings, discussion and description are merely meant to be illustrative of particular embodiments of the invention and not limitations upon the practice thereof. It is the following claims, including all equivalents, which define the scope of the invention.

I claim:

1. Landscape edging of the type comprising a base member having a raised wall member disposed generally perpendicular thereto wherein:
   I. said base member is a hollow member which comprises:
      a. a first and second ground contacting wall;
      b. a first flange disposed in a spaced-apart and generally inclined relationship with the subjacent earth and having a first edge thereof which is closest to the earth supported by the first ground contacting wall; and
      c. a second flange disposed in a spaced-apart and generally inclined relationship with the subjacent earth and having a first edge thereof which is closest to the earth supported by the second ground contacting wall;
   II. the raised wall member is disposed proximate a second edge of each of said flanges and at an approximate right angle to the earth, whereby the wall member and first flange cooperate to retain mulch media and the inclined flanges are operative to drain moisture away from the raised wall member and toward the earth.

2. Landscape edging as in claim 1, wherein said base member and said wall member are fabricated from a material selected from the group consisting essentially of synthetic polymeric materials, fiber-reinforced polymeric materials, concrete, metals and combinations thereof.

3. Landscape edging as in claim 1, wherein said base member is an elongated, generally straight member.

4. Landscape edging as in claim 1, wherein said base member is arcuate-shaped and configured to be placed in abutting relationship with another of said members.

5. Landscape edging as in claim 1, wherein said base member is an annulus configured to be placed around said plant life, said annulus defining a central opening for receiving said plant life therein.

6. Landscape edging as in claim 1, wherein said wall portion is of a first width proximate said base member and is configured to constantly taper to a lesser second width at a point distal said base member.

7. Landscape edging as in claim 1, wherein said flanges are inclined at about a 5 degree angle relative to the earth.

8. Landscape edging as in claim 1, wherein said base member and said wall member comprise a single, unitary, polymeric body.

* * * * *